US006730748B2

(12) United States Patent
Chung et al.

(10) Patent No.: US 6,730,748 B2
(45) Date of Patent: May 4, 2004

(54) THERMOPLASTIC POLYCARBONATE COMPOSITIONS HAVING HIGH TOUGHNESS

(75) Inventors: James Y. J. Chung, Wexford, PA (US); Winfried G. Paul, Coraopolis, PA (US); Michael Erkelenz, Duisburg (DE); Melanie Moethrath, Duesseldorf (DE); Klaus Horn, Dormagen (DE)

(73) Assignees: Bayer Polymers LLC, Pittsburgh, PA (US); Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/191,583

(22) Filed: Jul. 9, 2002

(65) Prior Publication Data

US 2004/0010097 A1 Jan. 15, 2004

(51) Int. Cl.[7] ................................. C08L 69/00
(52) U.S. Cl. ........................ 525/469; 525/462
(58) Field of Search ................. 525/462, 469

(56) References Cited

U.S. PATENT DOCUMENTS

| 5,286,834 | A | 2/1994 | Sakashita et al. | 528/198 |
| 5,401,826 | A | 3/1995 | Sakashita et al. | 528/204 |
| 5,470,938 | A | 11/1995 | Sakashita et al. | 528/198 |
| 5,532,324 | A | 7/1996 | Sakashita et al. | 525/462 |
| 2003/0040586 | A1 | 2/2003 | Kratschmer et al. | 525/469 |

FOREIGN PATENT DOCUMENTS

| DE | 100 47 483 | | 4/2002 |
| JP | 05080548 | * | 4/1993 |
| JP | 07199488 | * | 8/1995 |
| JP | 2000147803 | * | 5/2000 |
| WO | 93/18090 | | 9/1993 |

* cited by examiner

*Primary Examiner*—David J. Buttner
(74) *Attorney, Agent, or Firm*—Joseph C. Gil; Gary F. Matz; Aron Preis

(57) ABSTRACT

A thermoplastic molding composition that features improved low-temperature properties and is thus suitable for application in exterior automotive parts is disclosed. The composition contains (A) 80 to 60 percent of a copolycarbonate wherein 65 to 75 mole percent of its structural units are derived from compounds of formula (I)

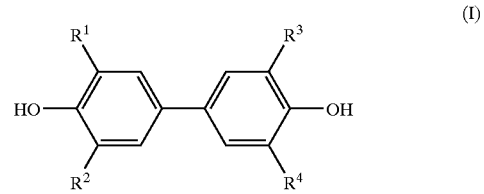

wherein $R^1$, $R^2$, $R^3$ and $R^4$ independently of one another represents H, $C_1$–$C_4$-alkyl, phenyl, substituted phenyl or halogen, and wherein 25 to 35 mole percent of its structural units are derived from compounds of formula (II)

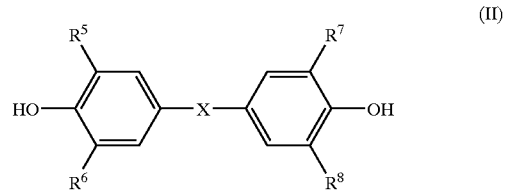

where $R^5$, $R^6$, $R^7$ and $R^8$ independently one of the others denote H, $CH_3$, Cl or Br and X is $C_1$–$C_5$-alkylene, $C_2$–$C_5$-alkylidene, $C_5$–$C_6$-cycloalkylene, $C_5$–$C_{10}$-cycloalkylidene and (B) 20 to 40 percent of a homopolycarbonate of bisphenol A having a melt flow rate, determined in accordance with ASTM D-1238 under 1.2 kg loading at 300° C. of 3 to 12 gm/10 minutes.

7 Claims, No Drawings

THERMOPLASTIC POLYCARBONATE COMPOSITIONS HAVING HIGH TOUGHNESS

FIELD OF THE INVENTION

The invention relates to thermoplastic compositions and more particularly to polycarbonate compositions having high impact strength at low temperatures.

SUMMARY OF THE INVENTION

A thermoplastic molding composition suitable for making articles having good combination of properties is disclosed. The composition contains 80 to 60 percent of (A) a copolycarbonate wherein 65 to 75 mole percent of its structural units are derived from compounds of formula (I)

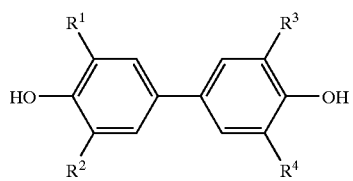

wherein $R^1$ to $R^4$ independently of one another represent H, $C_1$–$C_4$-alkyl, phenyl, substituted phenyl or halogen, and wherein 25 to 35 mole percent of its structural units are derived from compounds of formula (II)

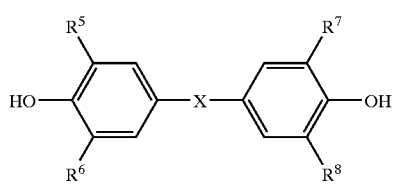

wherein $R^5$ to $R^8$ independently of the others denote H, $CH_3$, Cl or Br and X is $C_1$–$C_5$-alkylene, $C_2$–$C_5$-alkylidene, $C_5$–$C_6$-cycloalkylene, $C_5$–$C_{10}$-cycloalkylidene, and 20 to 40 percent of (B) a homopolycarbonate of bisphenol A having a melt flow rate, determined in accordance with ASTM D-1238 under 1.2 kg loading, at 300° C. of 3 to 12 gm/10 minutes, the percents in both occurrences being relative to the weight of the composition.

BACKGROUND OF THE INVENTION

Need has long been indicated for transparent, thermally stable polycarbonates that, in comparison to conventional Bisphenol-A based homopolycarbonates, also feature improved resistance to chemicals and better impact strength at low temperatures.

Copolycarbonates based on 4,4'-dihydroxydiphenyl (herein "DOD") and 2,2-bis(4-hydroxyphenyl)propane are already known from JP5117382, EP 544 407 and U.S. Pat. Nos. 5,470,938; 5,532,324 and 5,401,826 These are disclosed as being resistant to chemicals and heat and are flame retardant, while having the same mechanical properties and transparency as commercially available homopolycarbonate of bisphenol A.

DE 10047483.7 describes copolycarbonates of 4,4'-dihydroxydiphenyl and 2,2-bis(4-hydroxyphenyl)propane (bisphenol A) that exhibit particularly good low-temperature properties. However, it is also described that the good low-temperature properties diminish as the content of 4,4'-dihydroxydiphenyl falls. Since 4,4'-dihydroxydiphenyl is an expensive component in comparison with 2,2-bis(4-hydroxyphenyl)-propane, it is desirable for reasons of cost to keep the 4,4'-dihydroxy-diphenyl content as low as possible, without losing the desired improvement in the low-temperature strength.

A presently pending patent application Ser. No. 10/196,874 disclosed blends containing copolycarbonates of DOD and homopolycarbonate of bisphenol A that exhibit highly desirable properties.

There is a need in material suitable for applications where low temperature impact strength is required. The impact strength is that which is determined as notched Izod and as multiaxial impact strength. It has now been found that the art has not recognized the critical dependence of the multi-axial impact strength at low temperatures on the melt flow rate of the homopolycarbonate component. It has also been found that not all the blends thus disclosed are the equivalents to one another and that compositions within a narrowly defined range exhibit surprising and unexpected properties.

DETAILED DESCRIPTION OF THE INVENTION

Accordingly, the present invention relates to a thermoplastic molding composition containing 80 to 60, preferably 65 to 75, percent of (A) a copolycarbonate wherein 65 to 75, preferably 68 to 73, mole percent of its structural units are derived from compounds of formula (I)

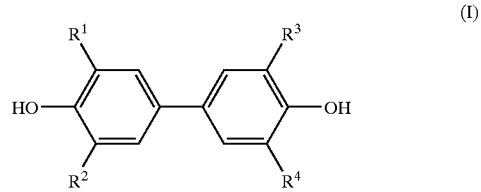

wherein $R^1$, $R^2$, $R^3$ and $R^4$ independently of one another represents H, $C_1$–$C_4$-alkyl, phenyl, substituted phenyl or halogen, preferably H, $C_1$–$C_4$-alkyl or halogen, and particularly preferably all represent the same radical, especially H or tert-butyl, and 25 to 35, preferably 27 to 32, mole percent of its structural units are derived from compounds of formula (II)

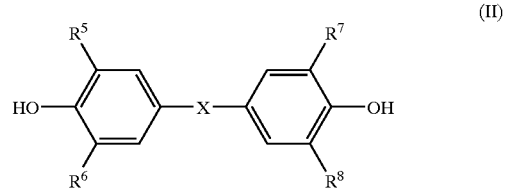

wherein $R^5$, $R^6$, $R^7$ and $R^8$ independently one of the others denote H, $CH_3$, Cl or Br and X is $C_1$–$C_5$-alkylene, $C_2$–$C_5$-alkylidene, $C_5$–$C_6$-cycloalkylene, $C^5$–$C_{10}$-cycloalkylidene, and 20 to 40, preferably 25 to 35, percent of (B) a homopolycarbonate of bisphenol A, having a melt flow rate, determined in accordance with ASTM D-1238 under 1.2 kg loading, at 300° C. (herein "MFR") of 3 to 12 gm/10 minutes, the percents, both occurrences being relative to the weight of the composition.

Surprisingly, it has now been found that the polycarbonate blends according to the invention have good low-temperature properties including notched Izod and multi-axial impact strength.

The inventive composition is useful in making molded articles wherever the properties profile of conventional polycarbonate and copolycarbonate is insufficient. Particular applicability of the composition is indicated in the electrical and construction sectors, including glazing, especially in the automotive sector as well as in making films, sheets, fittings or housing parts where dimensional stability under heat, chemical resistance and good low-temperature properties are required.

According to the invention, low temperatures are to be understood as being temperatures below 0° C., particularly preferably below −10° C., most particularly preferably below −30° C.

Suitable compounds of formula (I) include 4,4'-dihydroxydiphenyl (DOD) and 4,4'-dihydroxy-3,3',5,5'-tetra(tert-butyl)diphenyl, 4,4'-dihydroxy-3,3',5,5'-tetra(n-butyl)diphenyl and 4,4'-dihydroxy-3,3',5,5'-tetra(methyl)diphenyl. 4,4'-dihydroxydiphenyl is particularly preferred.

Suitable compounds of formula (II) are 2,2-bis(4-hydroxyphenyl)propane, 1,1-bis(4-hydroxyphenyl)-3,3,5-trimethylcyclohexane and 1,3-bis[2-(4-hydroxyphenyl)-2-propyl]benzene, 1,1-bis(4-hydroxyphenyl)-1-phenylethane, 1,1-bis(4-hydroxyphenyl)-cyclohexane, especially 2,2-bis(4-hydroxyphenyl)propane (bisphenol A) and 1,1-bis(4-hydroxyphenyl)-3,3,5-trimethylcyclohexane (bisphenol TMC). Particularly preferred is 2,2-bis(4-hydroxyphenyl)propane (bisphenol A).

The copolycarbonate (A) may be derived from one or more compounds of formula (I) and one or more compounds of formula (II).

The preparation of (co)polycarbonates is known.

The preparation of polycarbonates by the interfacial process or by the melt transesterification process is known. Reference is made in this connection to "Schnell", Chemistry and Physics of Polycarbonates, Polymer Reviews, Vol. 9, Interscience Publishers, New York, London, Sydney, 1964, p. 33 ff and to Polymer Reviews, Volume 10, "Condensation Polymers by Interfacial and Solution Methods", Paul W. Morgan, Interscience Publishers, New York 1965, Chap. VIII, p. 325, incorporated herein by reference.

Generally, the preparation of copolycarbonates involving compounds of formula (I) takes place preferably in solution, namely by the interfacial process or the process in homogeneous phase. Preparation by the melt transesterification process is also possible, which process is described, for example, in DE-A 19 64 6401 or in DE-A 1 42 38 123. Transesterification processes are also described in U.S. Pat. Nos. 3,494,885; 4,386,186; 4,661,580; 4,680,371 and 4,680,372 (all incorporated by reference herein) and in EP 26120, 26121, 26684, 28030, 39845, 91602, 97970, 79075, 146887, 156103, 234913, 240301 and in DE1495626 and 2232977.

The polycarbonate and copolycarbonate according to the invention preferably contain structural units derived from any of a variety of chain terminators. Suitable chain terminators include ones conforming to formula (III)

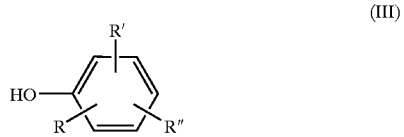

(III)

wherein R, R' and R" each independently of the others represent H, optionally branched $C_1$–$C_{34}$-alkyl or cycloalkyl, $C_7$–$C_{34}$-alkaryl or $C_6$–$C^{34}$-aryl. The preferred chain terminators include butylphenol, tritylphenol, cumylphenol, phenol and octylphenol. The most preferred are butylphenol and phenol. The chain terminators used in the making of copolycarbonate (A) may be either the same as or are different from the ones used in the preparation of polycarbonate (B).

The individual components (A) and (B) may, independently of each other, contain small amounts of from 0.02 to 3.6 mol % (based on the dihydroxy compound) of branching agents. Suitable branching agents are compounds having three or more functional groups, preferably those having three or more phenolic OH groups, for example, 1,1,1-tri-(4-hydroxyphenyl)ethane and isatin biscresol.

In order to alter the properties of the inventive compositions, additives, fillers and/or reinforcing agents may be incorporated. These include thermal stabilizers, UV stabilizers, flow modifiers, mold-release agents, flame retardants, pigments, finely divided minerals, fibrous substances, flame retardant agents, such as alkyl and aryl phosphites, phosphates, phosphanes, low molecular weight carboxylic acid esters, halogenated compounds, salts, chalk, quartz powder, glass fibers and carbon fibers, pigments and combinations thereof. Such compounds that are known in the art for their efficacy in imparting special effects or properties to thermoplastic polycarbonate compositions are known and have been disclosed in "Plastics Additives", R. Gächter and H. Müller, Hanser Publishers, 1983, incorporated herein by reference.

Other polymers, for example polyolefins, polyurethanes, polyesters, acrylonitrile-butadiene-styrene and polystyrene, may also be blended with the components of the inventive composition.

Such substances may be added to the inventive composition by conventional means and following conventional procedures.

The components (A) and (B) have weight-average molecular weights of 10,000 to 60,000, preferably 20,000 to 55,000, as determined at room temperature by relative solution viscosity (solution of 0.5% by weight) in dichloromethane or in mixtures of equal amounts by weight of phenol/o-dichlorobenzene, calibrated by light scattering.

The polycarbonate blends according to the invention are thermoplastically processable conventionally at temperatures of 240° C. to 380° C., preferably 260° C. to 360° C. Molded articles and films of any kind may be produced in a known manner by means of injection molding or by extrusion. The present application relates also to molded articles and extrudates produced from the inventive composition.

The inventive composition is readily soluble in solvents such as chlorinated hydrocarbons, for example, methylene chloride, and may thus be processed, for example, in a known manner to cast films.

The Examples which follow are intended to illustrate the present invention, but without limiting it:

EXAMPLES

Copolycarbonate, component (A) was prepared containing 30 mol % dihydroxydiphenyl (DOD) and 70 mol % bisphenol A. Tert-butylphenol was used as chain terminator. The granules have a relative solution viscosity of 1.30.

A homopolycarbonate based on bisphenol A having the indicated melt flow rate (MFR) was used as component (B) and in the comparative examples.

The exemplified compositions contained conventional flame retardant, UV stabilizer and pigments none believed to have criticality to the present findings. The impact performance at −30° C. and at −40° C. was determined as notched Izod impact strength and instrumented (multi-axial) impact strength both at ⅛" thickness. The multi-axial impact test was carried out on test specimens in the form of discs of 4" diameter at a speed of 15 mph using 3 in. window and a dart ½" in radius.

The preparation of the compositions was carried out conventionally. The results of the tests are summarized in Table 1.

The indicated "component A" was a copolycarbonate of 30 mole % DOD and 70 mole % bisphenol A (BPA).

The indicated "homopolycarbonate" was a BPA-based homopolycarbonate. The melt flow rate, MFR, is indicated in gm/10 minutes determined in accordance with ASTM D-1238 under 1.2 kg loading at 300° C. The amounts of the components are in percent by weight, relative to the composition.

The compositions further contained a conventional flame retarding agent, a UV stabilizer and pigments having no relevance to the findings of the present invention.

TABLE 1

| Example | A | B | C | D |
|---|---|---|---|---|
| Component A | 80 | 70 | 60 | 70 |
| Homopolycarbonate, MFR = 4.7 | 20 | 30 | 40 | 0 |
| Homopolycarbonate, MFR = 13.1 | 0 | 0 | 0 | 30 |
| MFR of the composition | 8.2 | 8 | 7 | 9.9 |
| Notched Izod (ft-lbs./in): | | | | |
| at −30° C. | 6.2 | 7.3 | 8.7 | 5.4 |
| at −40° C. | 5.7 | 4.2 | 3.7 | 4.8 |
| Multi-axial Impact Strength (ft-lb.): | | | | |
| at −30° C. | 37.4 | 36.2 | 40.3 | 42.8 |
| at −40° C. | 41 | 42.2 | 45.4 | 39.8 |
| Failure mode | Ductile | Ductile | Ductile | ductile/brittle |

The results shown above point to the criticality of MFR of the homopolycarbonate in the context of the invention.

Example D showed an undesirable failure mode at the low temperature of testing.

In an additional series of experiments the compositions contained "component A" as above and as "component B", a homopolycarbonate of BPA having MFR of 4.7. The results are shown in Table 2. The compositions further contained white pigment having no criticality to the findings of the present invention.

TABLE 2

| Example | A | B | C |
|---|---|---|---|
| Pigment | 1 | 1 | 1 |
| Homopolycarbonate of BPA, MFR = 4.7 | 99 | 0 | 30 |
| Component A | 0 | 99 | 69 |
| MFR of the composition | 5.3 | 8.8 | 7.5 |
| Notched Izod (ft-lbs./in): | | | |
| at −30° C. | 6.4 | 7.7 | 11.5 |
| at −40° C. | 2.9[1] | 7.1 | 10.1 |
| Multiaxial Impact Strength (ft-lb): | | | |
| at −30° C. | 44.8 | 36.1[2] | 38.4 |
| at −40° C. | 47.7 | 33.3[3] | 39.3 |

[1]all five specimens tested failed in brittle mode.
[2]one out of five specimens tested failed in brittle mode.
[3]three out of five specimens tested failed in brittle mode.

The results point to the surprising improved impact performance of the inventive composition in both notched Izod- and multi-axial-impact strengths at low temperatures. In comparison, polycarbonate resin, component B exhibits (Example A) poor notched Izod and good performance under multi-axial Impact test. On the other hand, a copolycarbonate of DOD, Component A, alone (Example B) exhibits good Izod impact strength but poor performance under multi-axial impact testing. The composition in accordance with the invention (Example C) exhibits a greater notched Izod value at low temperatures than either component alone, and ductile failure mode with intermediate values of multi-axial impact strength.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic blend composition comprising
   (A) 80 to 60 percent, relative to the total weight of (A) and (B), of a copolycarbonate wherein 65 to 75 mole percent of its structural units are derived from compounds of formula (I)

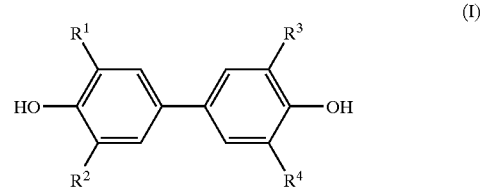

(I)

wherein $R^1$, $R^2$, $R^3$ and $R^4$ independently of one another represents H, $C_1$–$C_4$-alkyl, phenyl, substituted phenyl or halogen, and wherein 25 to 35 mole percent of its structural units are derived from compounds of formula (II)

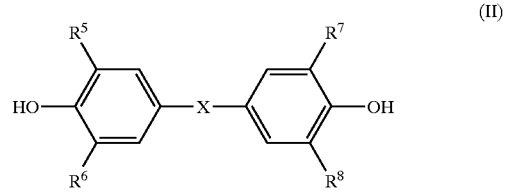

(II)

where $R^5$, $R^6$, $R^7$ and $R^8$ independently one of the others denote H, $CH_3$, Cl or Br and X is $C_1$–$C_5$-alkylene, $C_2$–$C_5$-alkylidene, $C_5$–$C_6$-cycloalkylene, $C_5$–$C_{10}$-cycloalkylidene and
   (B) 20 to 40 percent, relative to the total weight of (A) and (B), of a homopoly-carbonate of bisphenol A having a melt flow rate, determined in accordance with ASTM D-1238 under 1.2 kg loading, at 300° C. of 3 to 12 gm/10 minutes, the percents, both occurrences being relative to the weight of the composition.

2. The composition of claim 1 comprising 65 to 75 percent of (A) and 25 to 35 percent of (B).

3. The composition of claim 1 wherein 68 to 73 mole percent of the structural units of (A) are derived from compounds of formula (I).

4. The composition of claim 1 wherein $R^1$, $R^2$, $R^3$ and $R^4$ independently of one another represents H, $C_1$–$C_4$-alkyl or halogen.

5. The composition of claim 1 wherein $R^1$, $R^2$, $R^3$ and $R^4$ are the same and denote H or tert-butyl.

6. The molding composition of claim 1 wherein the compound of formula (I) is dihydroxydiphenyl and the compound of formula (II) is bisphenol A.

7. A molded article comprising the composition of claim 1.

* * * * *